United States Patent
Han et al.

(10) Patent No.: US 8,571,121 B2
(45) Date of Patent: Oct. 29, 2013

(54) METHOD FOR SER APPROXIMATION FOR OSTBC IN DISTRIBUTED WIRE COMMUNICATION SYSTEMS

(75) Inventors: Shuangfeng Han, Suwon-si (KR); Seong-Taek Hwang, Pyeongtaek-si (KR); Han-Lim Lee, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 942 days.

(21) Appl. No.: 12/034,723

(22) Filed: Feb. 21, 2008

(65) Prior Publication Data

US 2008/0205538 A1 Aug. 28, 2008

(30) Foreign Application Priority Data

Feb. 22, 2007 (KR) .................. 10-2007-0017938

(51) Int. Cl.
*H04L 27/10* (2006.01)

(52) U.S. Cl.
USPC ........................ 375/260; 375/267; 375/299

(58) Field of Classification Search
USPC ........................ 375/299, 260, 267
See application file for complete search history.

(56) References Cited

U.S. PATENT DOCUMENTS

| | | | |
|---|---|---|---|
| 2007/0253507 A1* | 11/2007 | Zhou et al. | 375/267 |
| 2008/0080449 A1* | 4/2008 | Huang et al. | 370/342 |

FOREIGN PATENT DOCUMENTS

| | | |
|---|---|---|
| KR | 2003-087296 | 11/2003 |
| KR | 2005-020133 | 3/2005 |
| KR | 2006-63478 | 6/2006 |
| KR | 2006-135155 | 12/2006 |
| WO | WO 00/72464 | 11/2000 |

OTHER PUBLICATIONS

IEEE Transactions on Signal Processing, vol. 50, No. 10, Oct. 2002, pp. 2599-2613.*
Bi, Qi, et al.; Patent Application Publication No: US 2006/0067242 A1; Publication Date: Mar. 30, 2006; "Packet Error Rate Estimation in a Communication System;".

* cited by examiner

*Primary Examiner* — Chieh M Fan
*Assistant Examiner* — Freshteh N Aghdam
(74) *Attorney, Agent, or Firm* — Cha & Reiter, LLC

(57) ABSTRACT

A method for Symbol Error Rate (SER) approximation of an SER-based transmission power allocation operation for an Orthogonal Space Time Block Code in a DWCS equipped with multiple transmission Distributed Antennas (DA) geographically dispersed at random. The method for SER approximation includes the steps of: setting multiple combinable antenna subsets from the multiple DAs; selecting a quasi-optimal antenna subset $A_g$ ($1 \leq g \leq 2^n - 1$) having a quasi-optimal power allocation weight $w_g$ based on predetermined power allocation, for each of the set multiple antenna subsets; and calculating an SER approximation value of the selected quasi-optimal antenna subset by applying a Probability Density Function (PDF) of a Signal-to-Noise Ratio (SNR) to the OSTBC SER having symbol constellation of a predetermined modulation scheme. The output of the SER approximation value can be output to a transmitter, or to a space-time encoder of a central processor for optimal power transmission.

12 Claims, 3 Drawing Sheets

METHOD FOR SER APPROXIMATION FOR OSTBC IN DISTRIBUTED WIRE COMMUNICATION SYSTEMS

CLAIM OF PRIORITY

This application claims the benefit of priority under 35 U.S.C. §119(a) of an application entitled "Method for SER Approximation for OSTBC in DWCS," filed in the Korean Intellectual Property Office on Feb. 22, 2007 and assigned Serial No. 2007-17938, the contents of which are hereby incorporated by reference in its entirety.

BACKGROUND OF THE INVENTION

1. Field of the Invention

The present invention relates to a distributed input-distributed output wireless communication system using space-time coding techniques. More particularly, the present invention relates to a method for approximating Symbol Error Rate (SER) performance for an Orthogonal Space Time Block Code (OSTBC) equipped with multiple transmission Distributed Antennas.

2. Description of the Related Art

Relatively recently-developed techniques for wireless communication include a spatial multiplexing technique and a space-time coding technique. One specific type of space-time coding is referred to as "MIMO" for Multiple Input Multiple Output. The MIMO technique typically uses a plurality of antennas in receiving and transmitting signals, so that multiple independent radio waves can be transmitted at the same time within the same frequency.

In general the MIMO technique is based on use of spatially separated antennas by generating parallel space data streams within a common frequency bandwidth. Even if individual signals are to be transmitted within the same frequency, the radio waves are transmitted such that the signals can be divided and demodulated in a receiver, so as to generate a plurality of communication channels which are statistically independent (i.e. effectively divided). Therefore, in contrast to a standard wireless communication system prohibiting multiple paths (i.e. a plurality of signals with the same frequency, which are delayed in time and have various amplitudes and phases), the MIMO technique can utilize multiple path signals having nearly no correlation (or having weak correlation), so as to accomplish an improved signal-to-noise ratio (SNR) and a larger throughput within an appropriate frequency bandwidth.

In one specific application of a MIMO technique, a theoretical result provided by references [1] and [2] presented below has indicated that a Distributed Antenna (DA) can be more advantageous than a co-located MIMO (C-MIMO) channel, in an aspect of capacity. However, research on a method for sufficiently exploiting the benefits of the capabilities of distributed antennas has not been thoroughly conducted. To this end, a concept of the Distributed Wireless Communication System (DWCS) was proposed by reference [3] presented below, and the system is expected to greatly increase system capacity because of the ability to manage transmission signals together with reception signals.

The OSTBC among various space-time codes (refers to reference [4]) is very attractive for real system arrangement on account of simple coding and decoding schemes. In future wireless communication systems, the bottle neck phenomenon may occur in transmitting downlink data, and thus an optimal downlink OSTBC design based on Channel State Information (CSI) estimation of a specific transmitter will be required to reduce or prevent such a bottle neck phenomenon.

FIG. 1 is a schematic block diagram illustrating a conventional system for OSTBC transmission through a co-located MIMO channel. Referring to FIG. 1, data symbols to be transmitted from a transmission side (i.e. a base station) are modulated by a designated modulation scheme and are input to a space-time encoder 100 for a space-time encoding, and then the resulting symbols are transmitted to a reception side 120 (i.e. a mobile terminal) through multiple co-located transmitting antennas 110. In this case, the reception side 120 has m reception antennas to receive the transmissions from the transmitting antennas.

In an OSTBC scheme through a distributed antenna, there is still no simple and exact expression for an SER. Therefore, it is very complicated to express the SER of an OSTBC transmitted through a distributed antenna, and it is thus difficult to calculate the SER. Therefore, in order to implement an actual system, a method for approximating SER in a simple and effective manner is required.

Moreover, the Chernoff upper bound of an SER is widely used for its performance analysis. However, this bound is not generally coherent, so it is difficult to directly predict the SER performance based on the Chernoff bound. Thus, there is a need in the art to provide a method for approximating an optimal.

SUMMARY OF THE INVENTION

Accordingly, the present invention has been made in part to solve at least some of the above-mentioned problems occurring in the prior art, and the present invention provides a method for approximating an optimal Symbol Error Rate (SER) performance for an Orthogonal Space Time Block Code (OSTBC) in a Distributed Wireless Communication System (DWCS).

In accordance with an aspect of the present invention, there is provided a method for SER approximation of an SER-based transmission power allocation operation for an Orthogonal Space Time Block Code (OSTBC) in a Distributed Wireless Communication System (DWCS) equipped with multiple transmission Distributed Antennas (DA) geographically dispersed at random, an exemplary method for SER approximation may include the steps of setting multiple combinable antenna subsets from the multiple DAs; selecting a quasi-optimal antenna subset $A_g$ ($1 \leq g \leq 2^n - 1$) having a quasi-optimal power allocation weight $w_g$ based on predetermined power allocation, for each of the set multiple antenna subsets; and calculating an SER approximation value of the selected quasi-optimal antenna subset by applying a Probability Density Function (PDF) of a Signal-to-Noise Ratio (SNR) to the OSTBC SER having symbol constellation of a predetermined modulation scheme.

BRIEF DESCRIPTION OF THE DRAWINGS

The above and other exemplary aspects, features and advantages of the present invention will be more apparent from the following detailed description taken in conjunction with the accompanying drawings, in which.

DETAILED DESCRIPTION OF THE INVENTION

Hereinafter, an exemplary embodiment of the present invention will be described with reference to the accompanying drawings. Although the exemplary embodiment of the present invention has been described for illustrative purposes, those skilled in the art will appreciate that various modifications, additions and substitutions are possible, without departing from the spirit of the invention and scope of the appended claims. Further, in the following description of the present invention, a detailed description of known functions and configurations incorporated herein will be omitted when it may obscure appreciation of the subject matter of the present invention by a person of ordinary skill in the art.

In the present invention, a quasi-optimal antenna subset and a quasi-optimal power allocation weight for each DA can be acquired, for example, by using a method as disclosed in reference [5]. Moreover, by using a method proposed in the present invention, a value approximating to an optimal SER can be calculated and directly used for performance prediction.

In the present invention, base station antennas (i.e. DAs) are geographically dispersed, and OSTBC symbols are transmitted to DAs, thereby accomplishing transmission diversity.

The transmitting antenna subset may comprise any combination of DAs. In the power allocation scheme of the present invention, the optimal subset having optimal power allocation is selected.

In the present invention, a quasi-optimal Power Allocation Scheme (PAS) for a transmitting antenna subset includes a scheme (PAS 1) allocating transmission power by using a water pouring algorithm and a scheme (PAS 2) simply allocating power in proportion to the Nakagami fading parameter 'm' of each DA. Such a power allocation is very close to an optimal power allocation at a high transmission power level.

In the present invention, by selecting an antenna subset based on the quasi-optimal power allocation of each antenna subset, it is possible to select the subset having the best SER performance, which is always close to optimal performance at a transmission power level.

In this case, power allocation is realized in a receiver and a result of the power allocation is fed back to a transmitter. The feedback channel has a low speed, because power allocation relays on large-scale channel fading. If large-scale channel fading changes, the result of power allocation is updated in the receiver and the result is then fed back to the transmitter.

Hereinafter, the present invention will be described in more detail with reference to accompanying drawings.

[System Model]

Figure 1:
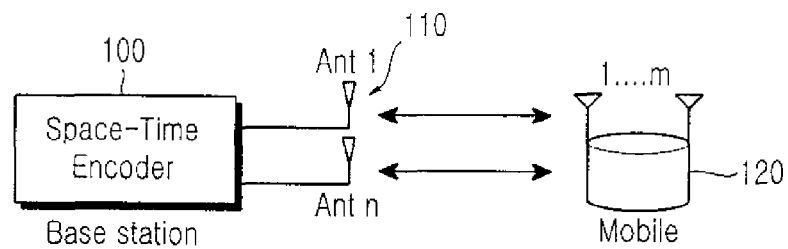
FIG. 1 is a schematic block diagram illustrating a system for OSTBC transmission through a conventional co-located MIMO channel.
Figure 2:
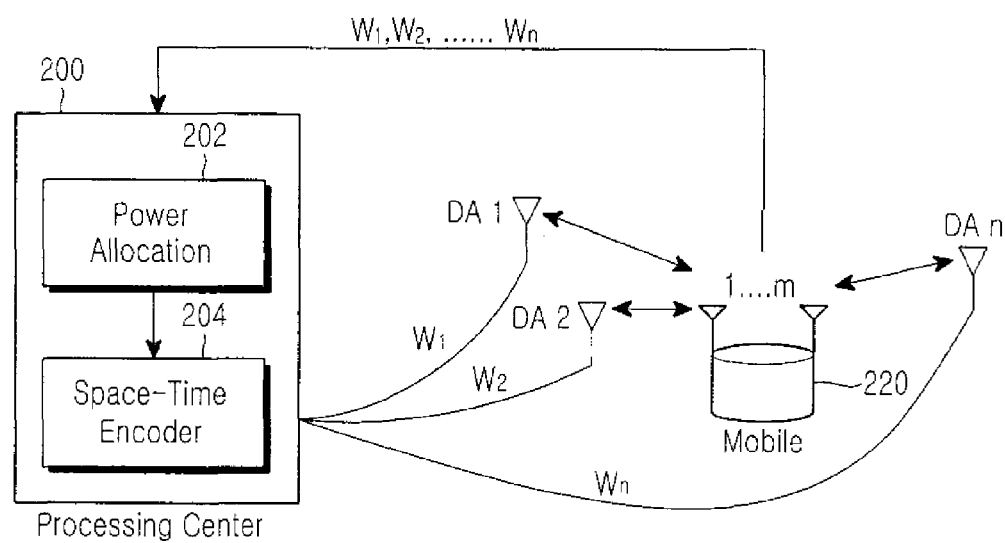
FIG. 2 is a schematic block diagram illustrating a system for OSTBC transmission in a DWCS according to an exemplary embodiment of the present invention.

FIG. 2 illustrates a schematic block diagram of a system for OSTBC transmission in a DWCS according to one exemplary embodiment of the present invention, which considers a downlink single user (n, m) DWCS. As shown in FIG. 2, in the present invention, n DAs 1 to n are geographically dispersed at random and a mobile terminal 220 (i.e. a reception side) has m antennas. All DAs are independently connected to a central processing center 200 in which transmission and reception signals of their DAs are processed. In general, comprehensive and microscopic fading of other DAs is independent of each other. It is assumed that fading of the reception antenna is also independent. Transmission diversity is accomplished by applying an OSTBC to these DAs.

In the present invention, an optimal transmitting antenna subset (combination of DAs) having the optimal power allocation is first acquired in a power allocation unit 202 of the central processing center 200. Then, OSTBC symbols having unit average power are generated by the space-time encoder 204 and the symbols are previously multiplied by a power allocation matrix P before transmission. Therefore, a diagonal power allocation matrix P can be expressed as P=diag $(\sqrt{w_1}, \sqrt{w_2}, \ldots, \sqrt{w_n})$, wherein $w_j$ (j=1, ..., n) represents a power allocation weight for the $j^{th}$ DA, and $$\sum_{j=1}^{J} w_j = 1.$$

It is assumed that the channel is frequency flat and a perfect Channel State Information (CSI) is available at a receiver. The relation between an effective input and an effective output can be expressed by equation (1) below.

$$y = \sqrt{\sqrt{P_0}} H P x + n \quad (1)$$

In equation (1), y denotes a reception vector, x denotes a transmission vector, n denotes an 1×n noise vector having an Independent Identically Distributed (i.i.d) complex number $N(0, \sigma^2)$ entry, and $P_0$ denotes total average transmission power Therefore, $P_0/\sigma^2$ denotes the Transmit Power to Receive Noise Ratio (TSNR), which is indicated by ρ. The channel gain from the $j^{th}$ transmission DA to the $k^{th}$ reception antenna corresponds to $h_{j,k} = \beta_{j,k} e^{i\theta_{j,k}}$, wherein $\theta_{j,k}$ is uniformly distributed in the range of $[0, 2\pi]$, $\beta_{j,k}$ denotes a Nakagami-distribution random variable, and the Probability Density Function (PDF) is defined by equation (2) below.

$$f_{\beta_{j,k}}(x) = \frac{2}{\Gamma(m_{j,k})} \left(\frac{m_{j,k}}{\Omega_{j,k}}\right)^{m_{j,k}} x^{2m_{j,k}-1} e^{-\frac{m_{j,k}}{\Omega_{j,k}} x^2} \quad (2)$$

In equation (2), $\Omega_{j,k} = E(\beta^2_{j,k})$ denotes the average power of $h_{j,k}$, and $m_{j,k}$ denotes a corresponding Nakagami fading parameter. Generally, $m_{j,k}$ is more than or equal to ½, which represents the fading severity. Note that $\Omega_{j,k}$, (j=1, ... n) corresponds to large-scale fading for the $j^{th}$ DA. The reception antenna is co-located, and thus $\Omega_{j,1} = \ldots = \Omega_{j,k} = \Omega_j$. In a general point-to-point MIMO channel, $\Omega_j$, (j=1, ..., n) is assumed to be identical, because the transmitting antennas are co-located. However, in the DWCS according to the present invention, the large-scale fading may greatly change due to geographical dispersion.

In the present invention, the transmitting antenna subset is defined as any combination of DAs. In this case, the number of DAs denotes n, and thus the total number of subsets denotes $2^n - 1$, which is expressed as $A_1, \ldots A_{2^n-1}$. For example, subset $A_n$ is assumed to include all of n DAs. The OSTBC rate is indicated by r, and $r = n_s/T$, which represents that n, independent data streams are transmitted during a period of T consecutive symbols. For descriptive convenience, since other antenna subsets may have different rates, subset $A_k$ is assumed to have only one rate $r_k$ (k=1, ..., $2^n-1$). In order to transmit symbols at the same data rate, other symbol constellation may be used in other antenna subsets. In the present invention, the constellation point is assumed to be $q_k$ of Quadrature Amplitude Modulation (QAM) and Phase Shift Keying (PSK) of subset $\Lambda_k$. For example, when symbols are transmitted at a data rate of 3 bit/s over 4 antenna subarrays using ¾ rate of OSTBC, the modulation type may be either 16 QAM or 16 PSK.

[Method for SER Approximation]

By employing a method briefly presented in reference [5], it is possible to acquire a quasi-optimal antenna subset together with a quasi-optimal power allocation weight for each DA. The method presented in the reference [5], which selects a quasi-optimal power allocation weight and a quasi-optimal antenna subset, will be separately described later.

In the present invention, subset $A_g$ ($1 \leq g \leq 2^n - 1$) is considered to have an optimal subset having the optimal power allocation weight $w_1, \ldots, w_g$ (some may have a value of 0). Based on an assumption that the $A_g$ is optimal, the method for approximating the OSTBC SER within the range of $A_g$ is described hereinafter.

At the time of detection, it is possible to acquire a characteristic function $\phi_\eta(s)$ of SNR $\eta$, wherein $\phi_\eta(s)$ can be expressed by equation (3) below.

$$\varphi_\eta(s) = \int_{-\infty}^{+\infty} f_\eta(x) e^{isx} dx = \prod_{j=1}^{g} (1 - si\Omega_j w_j q_j \rho / m_j)^{-m_j} \quad (3)$$

If the inverse transformation is applied to the the $\phi_\eta(s)$, the PDF of $\eta$ can be expressed as $$f_\eta(x) = \int_{-\infty}^{+\infty} \varphi_\eta(s) e^{-isx} ds$$

or can be also expressed by equation (4) below.

$$f_\eta(s) = \int_{-\infty}^{+\infty} \left( \prod_{j=1}^{g} (1 - si\Omega_j w_j q_j \rho / m_j)^{-m_j mg} e^{-isx} \right)^{\frac{1}{g}} ds \quad (4)$$

Since $A_g$ has been assumed as an optimal subset, contribution of each DA sub-array to the outage performance shall be similar, i.e., approximately $(1 - s\Omega_j w_j q_j \rho / m_j)^{-m_j}$. Otherwise, some weak DA sub-arrays may be utilized. Therefore, $f_\eta(x)$ is approximated as shown in equation (5) below.

$$f_\eta(x) \approx \prod_{j=1}^{g} \left( \int_{-\infty}^{+\infty} (1 - si\Omega_j w_j q_j \rho / m_j)^{-gm_j m} e^{-isx} ds \right)^{\frac{1}{g}} \quad (5)$$

$$= x^{m \sum_{j=1}^{g} m_j - 1} \prod_{j=1}^{g} (\Gamma(gm_j m))^{-\frac{1}{g}}$$

$$\left( \frac{\Omega_j w_j q_j \rho}{m_j} \right)^{-m_j m} e^{-\frac{m_j x}{\Omega_j w_j q_j \rho g}}$$

$$= x^{m \sum_{j=1}^{g} m_j - 1} e^{-\sum_{j=1}^{g} \frac{m_j x}{\Omega_j w_j q_j \rho g}}$$

$$\prod_{j=1}^{g} (\Gamma(gm_j m))^{-\frac{1}{g}} \left( \frac{\Omega_j w_j q_j \rho}{m_j} \right)^{-m_j m}$$

$$= x^{D-1} e^{-xC_2} C_1$$

-continued $$D = m \sum_{j=1}^{g} m_j,$$

$$C_1 = \prod_{j=1}^{g} (\Gamma(gm_j m))^{-\frac{1}{g}} (\Omega_j w_j q_j \rho / m_j)^{-m_j m},$$

$$C_2 = \sum_{j=1}^{g} m_j / \Omega_j w_j q_j \rho g.$$

The OSTBC SER having MQAM constellation is defined by equation (6) below.

$$P_{MQAM} = 1 - \left(1 - \int_0^\infty 2\left(1 - \frac{1}{\sqrt{M}}\right) Q\left(\sqrt{\frac{3}{M-1}} x\right) f_\eta(x) dx\right)^2 \quad (6)$$

The OSTBC SER having MPSK symbols on a subset $A_g$ is defined by an equation (7) below.

$$P_{M_g PSK} = \quad (7)$$

$$\int_0^\infty \left( 2Q(\sqrt{2x} \sin \frac{\pi}{M_g}) - \frac{1}{\pi} \int_{\frac{\pi}{2} - \frac{\pi}{M_g}}^{\frac{\pi}{2}} e^{-x(\sin \frac{\pi}{M_g})/\cos^2 \theta} d\theta \right) f_\eta(x) dx$$

In the case where $M_g \geq 4$, it can be approximated that $$P_{M_g PSK} \approx \int_0^\infty 2Q(\sqrt{2x} \sin(\pi/M_g)) f_\eta(x) dx.$$

The SERs of BPSK and QPSK on an Additive White Gaussian Noise (AWGN) channel can be approximated, for example, as shown in equations (8) and (9) below.

$$P_{BPSK} \approx \int_0^\infty Q(\sqrt{2x}) f_\eta(x) dx \quad (8)$$

$$P_{QPSK} \approx \frac{1}{2} \int_0^\infty Q(\sqrt{x}) f_\eta(x) dx$$

$$\int_0^\infty Q(\sqrt{\alpha x}) x^{D-1} e^{-\frac{x}{\beta}} dx = \frac{\beta^D}{2} \Gamma(D) \left(1 - \sum_{t=0}^{D-1} \mu \left(\frac{1-\mu^2}{4}\right)^t \binom{2t}{t}\right) \quad (9)$$

wherein, $$\mu = \sqrt{\alpha \beta / (\alpha \beta + 2)}.$$

If $f_\eta(x)$ is substituted into the equations (6) to (9), the SER approximation values can be obtained as shown in equations (10) to (13) below.

$$P_{M_g-QAM}^{A_g} \approx 1 - \quad (10)$$

$$\left(1 - C_1\Gamma(D)(C_2)^{-D} \times \left(1 - \frac{1}{\sqrt{M_g}}\right)\left(1 - \sum_{t=0}^{D-1} \mu\left(\frac{1-\mu^2}{4}\right)^t \binom{2t}{t}\right)\right)^2$$

wherein $$\mu = \sqrt{3/(3 + 2C_2(M_g - 1))}.$$

$$P_{M_g-PSK}^{A_g} \approx C_1\Gamma(D)(C_2)^{-D}\left(1 - \sum_{t=0}^{D-1}(1 + C_2/\sin^2(\pi/M_g))^{-0.5}\right. \quad (11)$$

$$\left. \left(\frac{1 - (1 + C_2/\sin^2(\pi/M_g))^{-1}}{4}\right)^t \binom{2t}{t}\right)$$

$$P_{BPSK}^{A_g} \approx \quad (12)$$

$$\frac{1}{2}C_1\Gamma(D)(C_2)^{-D}\left(1 - \sum_{t=0}^{D-1}(1+C_2)^{-0.5}\left(\frac{1-(1+C_2)^{-1}}{4}\right)^t \binom{2t}{t}\right)$$

$$P_{QPSK}^{A_g} \approx \quad (13)$$

$$\frac{1}{4}C_1\Gamma(D)(C_2)^{-D}\left(1 - \sum_{t=0}^{D-1}(1+2C_2)^{-0.5}\left(\frac{1-(1+2C_2)^{-1}}{4}\right)^t \binom{2t}{t}\right)$$

In a high TSNR region, $e^{-xC_2}$ in $f_\eta(x)$ can be further omitted, resulting in a simplified SER expression, as equations (14) and (15).

$$P_{M_g-QAM}^{A_g(\text{High}\_\rho)} = \quad (14)$$

$$1 - \left(1 - \frac{\prod_{t=1}^{D}(2D - (2t-1))}{D}\left(1 - \frac{1}{\sqrt{M_g}}\right)\left(\frac{3}{M_g - 1}\right)^{-D}C_1\right)^2$$

$$P_{M_g-PSK}^{A_g(\text{High}\_\rho)} = \frac{\prod_{t=1}^{D}(2D - (2t-1))}{D}(2\sin^2(\pi/M_g))^{-D}C_1 \quad (15)$$

The above-described method for SER approximation is implemented in a transmitter or a receiver of a DWCS. When the method is implemented in a transmitter, parameters of large-scale fading and Nakagami fading are fed back to the transmitter from the receiver.

[Numerical Value Result]

As an example for examining performance of a method according to the present invention, (3,1) DA topology is considered. It is assumed that an antenna subset $A_1$ includes DA1, an antenna subset $A_2$ includes DA1 and DA2, and an antenna subset $A_3$ includes all of the three DAs. The data speed is 3 bits/s and large-scale fading is $\Omega_1=1$, $\Omega_2=0.3$, and $\Omega_3=0.1$. A fading parameter is $m_1=m_2=m_3=1$. $A_1$ and $A_2$ are assumed to have a maximum speed (8 PSK symbol for 3 bits/s and 64 QAM for 6 bits/s), and $A_3$ is assumed to have a ¾ speed (16 QAM symbol for 3 bits/s and 256 QAM for 6 bits/s).

Figure 4:
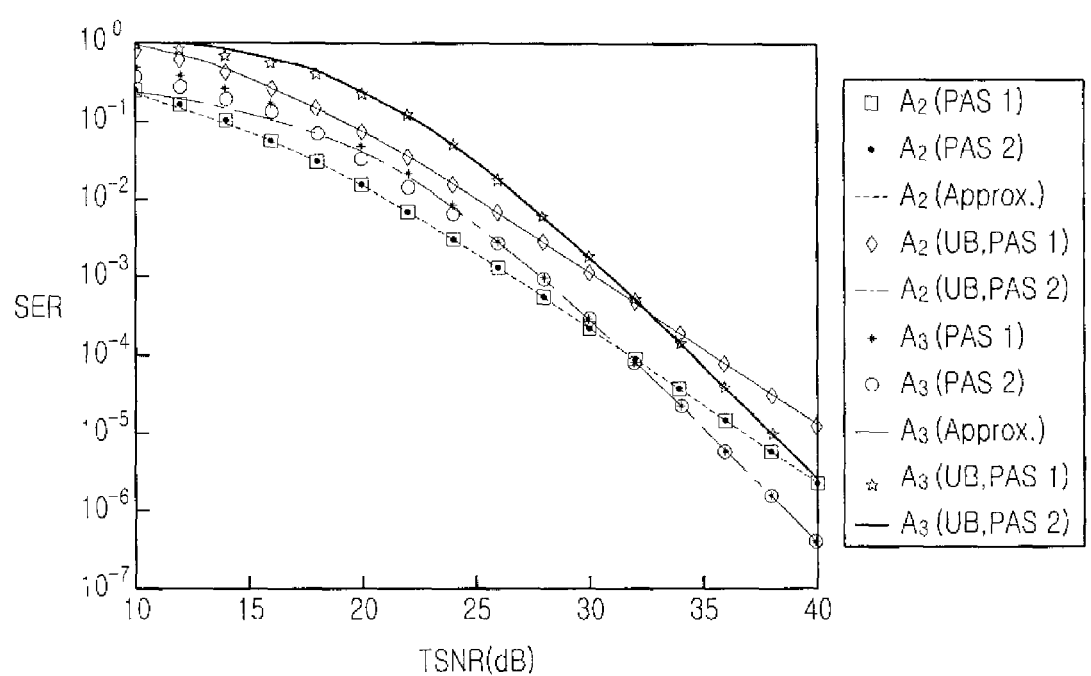
FIG. 4 is a graph illustrating a performance character of an adaptive transmission power allocation scheme for an OSTBC in a DWCS according to an exemplary embodiment of the present invention.

FIG. 4 is a graph illustrating a performance character of an adaptive transmission power allocation scheme for OSTBC in a DWCS according to an exemplary embodiment of the present invention. FIG. 4 illustrates the SER performance of $A_2$ and $A_3$, which employs both PAS 1 (water pouring algorithm) and PAS 2 (equal power allocation). The result is successful as shown by the graph in which SER performance of $A_2$ and $A_3$ for PAS 2 is very close to the case of PAS 1. In particular, this result is more successful in the case in which TSNR region for the subset is above a certain value, e.g. TSNR for $A_3$ is above 24 dB and TSNR for $A_2$ is above 12 dB.

In the cases of PAS 1 and PAS 2, upper bounds of $A_2$ and $A_3$ based on a Chernoff inequality are also shown and these upper bounds are not tight for the whole TSNR region plotted. However, it is possible to observe that SER upper bound of each subset for PAS 1 is very close to the case of PAS 2. Also, an intersection point of PAS 1 or PAS 2 for $A_2$ and $A_3$ is very close to an intersection point of real SER curve.

In the case of PAS 2, the SER approximation value of $A_2$ and $A_3$ is much more coherent than an upper bound (coherence of about 4 or 5 dB). In the much interested SER range, i.e., in the range of $10^{-3}$ through $10^{-2}$, their approximation values are very close to the actual SER performance.

[Reference 5]

[Quasi-Optimal Power Allocation for MQAM Symbols]

Hereinafter, the process of calculating a quasi-optimal power allocation weight presented in reference [5] will be described.

The SER of OSTBC having MQAM constellation is defined by equation (16).

$$P_{MQAM} = 1 - \left(1 - \int_0^\infty 2\left(1 - \frac{1}{\sqrt{M}}\right)Q\left(\sqrt{\frac{3}{M-1}}x\right)f_\eta(x)dx\right)^2 \quad (16)$$

According to the present invention, even if an optimal subset for OSTBC transmission is not known, the subset $A_g$ ($1 \leq g \leq 2^n - 1$) is regarded as an optimal subset having optimal power allocation weights $w_1, \ldots, w_g$ (some may have a value of 0), without loss of generality. If Chernoff bound is applied to a Q function, that is, $Q(x) \leq \exp(x^2/2)$, the SER upper bound of such a combined scheme (i.e. a scheme having $M_g$QAM symbols) may be defined by equation (17) below.

$$P_{M,QAM} \leq 1 - \left(1 - 2\left(1 - \frac{1}{\sqrt{M_g}}\right)\int_0^\infty e^{-\frac{3}{2(M_g-1)}x}f_\eta(x)dx\right)^2 = \quad (17)$$

$$1 - \left(1 - 2\left(1 - \frac{1}{\sqrt{M_g}}\right)\prod_{j=1}^{g}\left(1 + \frac{3}{2(M_g-1)}\Omega_j w_j \rho/m_j\right)^{-mm_j}\right)^2 =$$

$$P_{ub1}^{A_g}$$

In the present invention, it is noted that minimizing $P_{ub1}^{A_g}$ by optimally allocating transmission power is equivalent to the optimization problem, as shown in equation (18) below.

$$w^* = \text{argmax}\prod_{j=1}^{g}\left(1 - \frac{3}{2(M_g-1)}\Omega_j w_j \rho/m_j\right)^{mm_j} \quad (18)$$

The maximizing expression is a concave function depending on a variable $w_j$, and the maximization can be achieved by using the Lagrangian method. The function F is defined by equation (19) below.

$$F(w_1, w_2 \ldots w_g, u) = \quad (19)$$

$$\sum_{j=1}^{g} mm_j \log\left(1 + \frac{3}{2(M_g-1)}\Omega_j w_j \rho/m_j\right) - u\left(\sum_{j=1}^{g} w_j - 1\right)$$

In the case where $Q_j=2(M_g-1)m_j/3\Omega_j q_j \rho$, as shown in equation (20) below, $W^*_j (j=1, \ldots, g)$ can be obtained by repeatedly calculating an equality based on a water pouring algorithm.

$$\frac{\partial F}{w_j} = mm_j(Q_j + w_j)^{-1} - u = 0, \quad (20)$$

$$j = 1, \ldots, g$$

In the present invention, such a scheme is referred to as a first power allocation scheme (PAS 1). In a high TSNR region, a power allocation weight can be defined by equation (21) below.

$$w_j^* = m_j \Big/ \sum_{j=1}^{g} m_i, (j = 1, \ldots, g) \quad (21)$$

In the present invention, a scheme applying the equation (21) at any transmission power level is referred to as a second power allocation scheme (PAS 2).

[Quasi-Optimal Power Allocation for MPSK Symbols]

OSTBC SER having MPSK symbols on a subset $A_g$ can be expressed by equation (22) below.

$$P_{M_g PSK} = \quad (22)$$

$$\int_0^\infty \left( 2Q\left(\sqrt{2x}\sin\frac{\pi}{M_g}\right) - \frac{1}{\pi}\int_{\frac{\pi}{2}-\frac{\pi}{M_g}}^{\frac{\pi}{2}} e^{-x\left(\sin\frac{\pi}{M_g}\right)i\cos^2\theta} d\theta \right) f_\eta(x) dx$$

In the case where $m_g \geq 4$, the equation (22) can be approximated as $$P_{M_g PSK} \approx \int_0^\infty 2Q(\sqrt{2x}\sin(\pi/M_g))f_\eta(x)dx.$$

The SER of BPSK and QPSK through an AWGN channel can be approximated as shown in equations (23) and (24) below.

$$P_{BPSK} \approx \int_0^\infty Q(\sqrt{2x})f_\eta(x)dx \quad (23)$$

$$P_{QPSK} \approx \frac{1}{2}\int_0^\infty Q(\sqrt{x})f_\eta(x)dx \quad (24)$$

If Chernoff bound is applied to a Q function, the SER upper bound can be obtained by equations (25) and (26) below.

$$P_{M_g PSK} \approx \int_0^\infty 2Q(\sqrt{2x}\sin(\pi/M_g))f_\eta(x)dx \leq \quad (25)$$

$$2\int_0^\infty e^{-x\sin^2(\pi/M_g)}f_\eta(x)dx =$$

$$2\Phi_\eta(-\sin^2(\pi/M_g)) = 2\prod_{j=1}^{g}(1+\sin^2(\pi/M_g)\Omega_j w_j \rho/m_j)^{-mm_j}$$

$$P_{BPSK} \approx \int_0^\infty Q(\sqrt{2x})f_\eta(x)dx \leq \int_0^\infty e^{-x}f_\eta(x)dx = \quad (26)$$

$$\Phi_\eta(-1) = \prod_{j=1}^{g}(1+\Omega_j w_j \rho/m_j)^{-mm_j}$$

$$P_{QPSK} \approx \frac{1}{2}\int_0^\infty Q(\sqrt{x})f_\eta(x)dx \leq \frac{1}{2}\int_0^\infty e^{-\frac{1}{2}x}f_\eta(x)dx = \quad (27)$$

$$\frac{1}{2}\Phi_\eta\left(-\frac{1}{2}\right) = \frac{1}{2}\prod_{j=1}^{g}\left(1+\frac{1}{2}\Omega_j w_j \rho/m_j\right)^{-mm_j}$$

Similarly, for constellation of each of $M_g PSK$ ($M_g > 4$), BPSK, and QPSK, by applying $Q_j = m_j^j \sin^2(\pi/M_g)\Omega_j w_j q_j \rho$, $m_j/\Omega_j w_j q_j \rho$, and $2 m_j/\Omega_j w_j q_j \rho$, respectively, it is possible to obtain quasi-optimal power allocation weight by the Lagrangian method, as expressed in equation (20). It should be noted that power allocation in a high TSNR region uses the equation (21).

Figure 3:
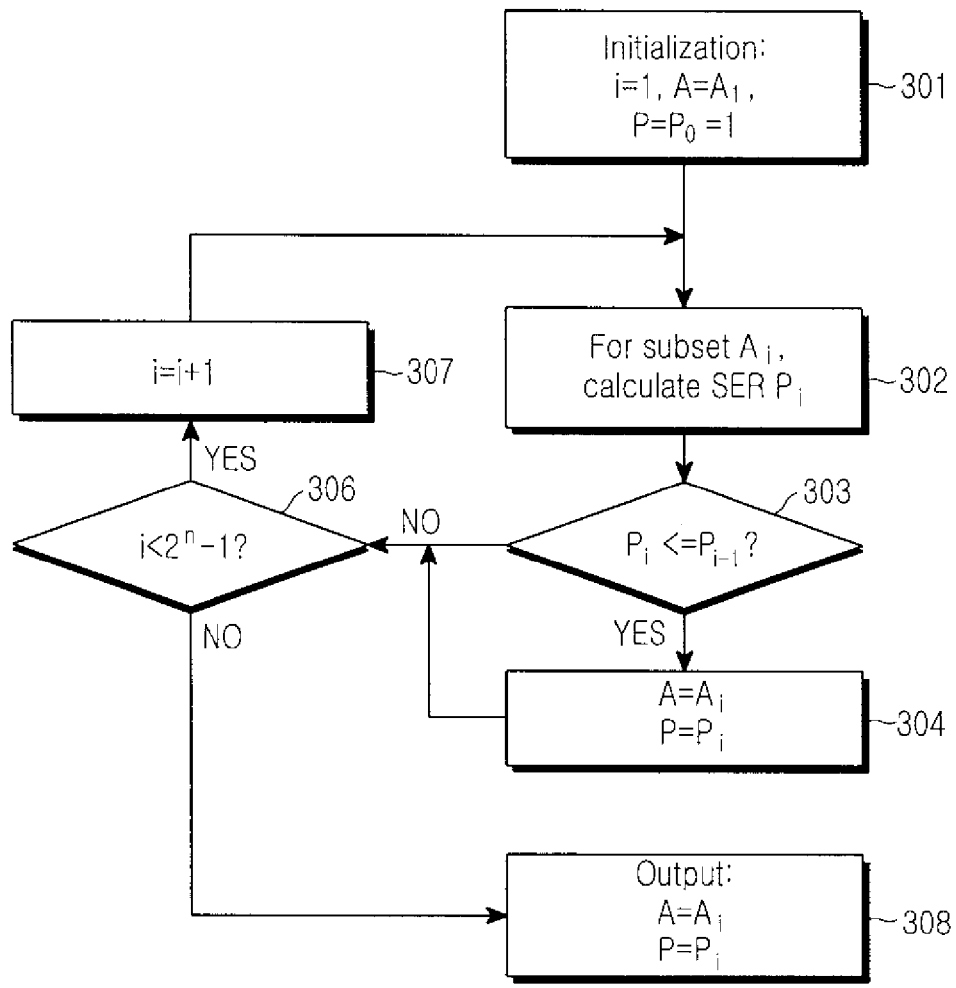
FIG. 3 is a flow diagram of an optimal transmission power allocation operation for OSTBC transmission in a DWCS according to an exemplary embodiment of the present invention.

[Quasi-optimal Antenna Subset Selection] in reference [5] will be described with reference to FIG. 3. FIG. 3 is a flow diagram illustrating a quasi-optimal transmission power allocation operation for OSTBC transmission in a DWCS according to one embodiment of the present invention. A specific step is required in order to acquire a quasi-optimal antenna subset. As shown in FIG. 3, for optimal power allocation, the following process is preferably performed.

First, initialization is performed. That is, $i=1$, $A=A_i$, $P=P_0=1$ are set, wherein A represents an optimal antenna subset and P represents quasi-optimal SER (step 301).

Quasi-optimal SER $P_i$ for a subset $A_i$ is calculated by using quasi-optimal power allocation schemes of PAS 1 and PAS 2 (step 302).

In this case, it is determined if the calculated SER $P_i <= P_{i-1}$ (step 303). If $P_i <= P_{i-1}$, $A=A_i$ and $P=P_i$ are set (step 304). By such a process, the most optimal SER (the lowest value) from among SERs for each subset is confirmed, so that it is possible to identify a corresponding subset equivalent to the optimal SER.

It is determined if $i < 2^n - 1$ (step 306). When $i < 2^n - 1$, $i = i+1$ is performed (step 307). Then, the process returns to step 302 in which SER is repeatedly calculated in a corresponding subset. Otherwise, step 307 is performed, in which the program is terminated and A and P are output. The output of the SER approximation value can be output, for example to a transmitter, or to a space-time encoder of the central processor for use optimal power transmission.

As such, it is possible to achieve an operation of an SER approximation method for an OSTBC in a DWCS according to one embodiment of the present invention. While the invention has been shown and described with reference to a certain exemplary embodiment thereof, it will be understood by those skilled in the art that various changes in form and details may be made therein without departing from the spirit and scope of the invention as defined by the appended claims.

As shown in the aforementioned examples and explanation, a method proposed by the present invention can provide an approximation value coherent to an optimal SER, so that this approximation value can be used directly for performance prediction. As has been demonstrated by numerical results, the present invention can also provide a very coherent SER approximation value and far outperform the Chernoff inequality based upper bound.

The following references are incorporated by reference in their entirety as background material:

[1] W. Rob and A. Paulraj, "MIMO Channel Capacity for the Distributed Antenna Systems," in Proc. IEEE VTC'02, vol. 2, pp. 706709, 2002.

[2] H. Zhuang, L. Dai, L. Xiao and Y. Yao, "Spectral Efficiency of Distributed Antenna System with Random Antenna Layout," Electronics Letters, vol. 39, no. 6, pp. 495-496, 2003.

[3] S. Zhou, M. Zhao, X. Xu, J. Wang, and Y Yao, "Distributed Wireless Communication System: A New Architecture For Future Public Wireless Access," IEEE Commun. Mag., vol. 41, no. 3, pp. 108-113, 2003.

[4] V Tarokli, H. Jafarkhani, and A. R. Calderbank, "Space-time Block Codes from Orthogonal Designs," IEEE Trans. Inform. Theory, vol. 45, pp. 14561467, July 1999.

[5] Korean patent application entitled "Adaptive Transmission Power Allocation Method for Forming an Orthogonal Space Time Block Code Together with a Beam Based on a Symbol Error Rate in a Distributed Wireless Communication System" (Application number: 10-2006-0115851; Inventor: Liansu-Angpung; Applicant: Samsung Electronics Co., Ltd.; Application date: 2006 Nov. 22).

What is claimed is:

1. A method for Symbol Error Rate (SER) approximation of an SER-based transmission power allocation operation for an Orthogonal Space Time Block Code (OSTBC) in a Distributed Wireless Communication System (DWCS) equipped with multiple transmission Distributed Antennas (DA) geographically dispersed at random, the method for SER approximation comprising the steps of:

setting a plurality of multiple combinable antenna subsets from dispersed multiple Das;

selecting quasi-optimal antenna subsets, each quasi-optimal antenna subset $A_g$ ($1 \leq g \leq 2^n-1$) having a quasi-optimal power allocation weight $w_g$ based on a predetermined power allocation, for each one of the plurality of multiple combinable antenna subsets;

calculating a plurality of SER approximation values of the selected quasi-optimal antenna subsets by applying a Probability Density Function (PDF) of a Signal-to-Noise Ratio (SNR) to a OSTBC SER having a symbol constellation of a predetermined modulation scheme;

determining an optimal SER approximation value to be equal to a minimum of the plurality of SER approximation values; and outputting the optimal SER approximation value to an encoder for optimal power allocation based on the optimal SER approximation value;

wherein the OSTBC SER includes at least one among an OSTBC SER having Multiple Quadrature Amplitude Modulation (MQAM) symbols, an OSTBC SER having M-ary Phase Shift Keying (MPSK) symbols, an OSTBC SER having Binary Phase Shift Keying (BPSK) symbols, and an OSTBC SER having Quadrature Phase Shift Keying (QPSK) symbols; and wherein the PDF of the SNR is defined by $$f_\eta(x) \approx \prod_{j=1}^{g} \left( \int_{-\infty}^{+\infty} (1 - si\Omega_j w_j q_j \rho / m_j)^{-gm_jm} e^{-isx} ds \right)^{\frac{1}{g}} =$$

$$x^{m\sum_{j=1}^{g} m_j - 1} \prod_{j=1}^{g} (\Gamma(gm_jm))^{-\frac{1}{g}} \left( \frac{\Omega_j w_j q_j \rho}{m_j} \right)^{-m_jm} e^{-\frac{m_jx}{\Omega_j w_j q_j \rho g}} =$$

-continued $$x^{m\sum_{j=1}^{g} m_j - 1} e^{-\sum_{j=1}^{g} \frac{m_jx}{\Omega_j w_j q_j \rho g}} \prod_{j=1}^{g} (\Gamma(gm_jm))^{-\frac{1}{g}} \left( \frac{\Omega_j w_j q_j \rho}{m_j} \right)^{-m_jm} =$$

$$x^{D-1} e^{-xC_2} C_1,$$

wherein $$D = m \sum_{j=1}^{g} m_j,$$

$$C_1 = \prod_{j=1}^{g} (\Gamma(gm_jm))^{-\frac{1}{g}} (\Omega_j w_j q_j \rho / m_j)^{-m_jm},$$

$$C_2 = \sum_{j=1}^{g} m_j / \Omega_j w_j q_j \rho g,$$

$$\eta = SNR,$$

$$f_\eta(x) = PDF \text{ of } \eta,$$

$w_j$=corresponding power allocation weight,
ρ=Transmit Power to Receive Noise Ratio (TSNR),
$m_j$=corresponding Nakagami fading parameter,
$\Omega_j$=the $j^{th}$ DA for large-scale fading, and
g=combination of optimal DAs.

2. The method for SER approximation according to claim 1, wherein, in a predetermined power allocation by a reception side, transmission power is allocated by using a water pouring algorithm.

3. The method for SER approximation according to claim 1, wherein in a predetermined power allocation by a reception side, allocating power in proportion to a Nakagami fading parameter of each DA of the multiple DAs.

4. The method for SER approximation according to claim 1, wherein the OSTBC SER having the at least one among an OSTBC SER having Multiple Quadrature Amplitude Modulation (MQAM) symbols, the OSTBC SER having M-ary Phase Shift Keying (MPSK) symbols, the OSTBC SER having Binary Phase Shift Keying (BPSK) symbols, and the OSTBC SER having Quadrature Phase Shift Keying (QPSK) symbols, is defined by $$P_{MQAM} = 1 - \left(1 - \int_0^\infty 2\left(1 - \frac{1}{\sqrt{M}}\right) Q\left(\sqrt{\frac{3}{M-1}} x\right) f_\eta(x) dx\right)^2,$$

$$P_{M_g PSK} = \int_0^\infty \left(2Q(\sqrt{2x} \sin\frac{\pi}{M_g}) - \frac{1}{\pi} \int_{\frac{\pi}{2}}^{\frac{\pi}{2} \frac{\pi}{M_g}} e^{-x\left(\sin\frac{\pi}{M_g}\right)/\cos^2\theta} d\theta\right) f_\eta(x) dx,$$

$$P_{BPSK} \approx \int_0^\infty Q(\sqrt{2x}) f_\eta(x) dx,$$

and $$P_{QPSK} \approx \frac{1}{2} \int_0^\infty Q(\sqrt{x}) f_\eta(x) dx, \text{ respectively,}$$

wherein
η=SNR,
$f_\eta(x)$=PDF of η, and
M=M-ary level of MQAM and MPSK.

5. The method for SER approximation according to claim 1, wherein the plurality of SER approximation values obtained by applying the PDF of the SNR to the OSTBC SER having symbols of MQAM, MPSK, BPSK, and QPSK are defined by $$P_{M_g-QAM}^{A_g} \approx$$

$$1 - \left(1 - C_1\Gamma(D)(C_2)^{-D} \times \left(1 - \frac{1}{\sqrt{M_g}}\right)\left(1 - \sum_{t=0}^{D-1} \mu\left(\frac{1-\mu^2}{4}\right)^t \binom{2t}{t}\right)\right)^2,$$

$$P_{M_g-PSK}^{A_g} \approx C_1\Gamma(D)(C_2)^{-D}\left(1 - \sum_{t=0}^{D-1} (1+C_2/\sin^2(\pi/M_g))^{-0.5}\right.$$

$$\left.\left(\frac{1-(1+C_2/\sin^2(\pi/M_g))^{-1}}{4}\right)^t \binom{2t}{t}\right),$$

$$P_{BPSK}^{A_g} \approx \frac{1}{2}C_1\Gamma(D)(C_2)^{-D}\left(1 - \sum_{t=0}^{D-1}(1+C_2)^{-0.5}\left(\frac{1-(1+C_2)^{-1}}{4}\right)^t \binom{2t}{t}\right),$$

and $$P_{QPSK}^{A_g} \approx \frac{1}{4}C_1\Gamma(D)(C_2)^{-D}\left(1 - \sum_{t=0}^{D-1}(1+2C_2)^{-0.5}\left(\frac{1-(1+2C_2)^{-1}}{4}\right)^t \binom{2t}{t}\right),$$

respectively, wherein $$D = m\sum_{j=1}^{g} m_j,$$

$$C_2 = \sum_{j=1}^{g} m_j/\Omega_j w_j q_j \rho g,$$

$$C_1 = \prod_{j=1}^{g} (\Gamma(gm_jm))^{-\frac{1}{g}} (\Omega_j w_j q_j \rho/m_j)^{-m_jm},$$

$$\mu = \sqrt{3/(3+2C_2(M_g-1))},$$

M=M-ary level of MQAM and MPSK,
$w_j$=corresponding power allocation weight,
$\rho$=Transmit Power to Receive Noise Ratio (TSNR),
$m_j$=corresponding parameter of Nakagami fading,
$\Omega_j$=large-scale fading for the $j^{th}$ DA, and
g=combination of optimal DAs.

6. The method for SER approximation according to claim 1, wherein, when the plurality of SER approximation values are calculated by applying the PDF of the SNR to the OSTBC SER having symbols of MQAM and MPSK, the SER approximation values are obtained by omitting $e^{-xC_2}$ from the PDF of the SNR in a high TSNR region, as defined by $$P_{M_g-QAM}^{A_g(\text{High-}\rho)} = 1 - \left(1 - \frac{\prod_{t=1}^{D}(2D-(2t-1))}{D}\left(1 - \frac{1}{\sqrt{M_g}}\right)\left(\frac{3}{M_g-1}\right)^{-D}C_1\right)^2,$$

and $$P_{M_g-PSK}^{A_g(\text{High-}\rho)} = \frac{\prod_{t=1}^{D}(2D-(2t-1))}{D}(2\sin^2(\pi/M_g))^{-D}C_1, \text{ respectively,}$$

wherein $$D = m\sum_{j=1}^{g} m_j,$$

$$C_1 = \prod_{j=1}^{g} (\Gamma(gm_jm))^{-\frac{1}{g}} (\Omega_j w_j q_j \rho/m_j)^{-m_jm},$$

$$C_2 = \sum_{j=1}^{g} m_j/\Omega_j w_j q_j \rho g,$$

$w_j$=corresponding power allocation weight,
$\rho$=Transmit Power to Receive Noise Ratio (TSNR),
$m_j$=corresponding parameter of Nakagami fading,
$\Omega_j$=large-scale fading for the $j^{th}$ DA, and
g=combination of optimal DAs.

7. The method for SER approximation according to claim 1, wherein the optimal SER approximation value is calculated by a transmitter of the DWCS.

8. The method for SER approximation according to claim 1, wherein the optimal SER approximation value is calculated by a receiver of the DWCS and the result of power allocation is fed back to a transmitter.

9. The method for SER approximation according to claim 1, wherein the optimal SER approximation value is calculated by a receiver of the DWCS, and parameters of large-scale fading and Nakagami fading are fed back to the transmitter from the receiver when the optimal SER approximation value is calculated by the receiver.

10. A method for Symbol Error Rate (SER) approximation of an SER-based transmission power allocation operation for an Orthogonal Space Time Block Code (OSTBC) in a Distributed Wireless Communication System (DWCS) equipped with multiple transmission Distributed Antennas (DA) geographically dispersed at random, the method for SER approximation comprising the steps of:
   setting a plurality of multiple combinable antenna subsets from dispersed multiple DAs;
   selecting quasi-optimal antenna subsets, each quasi-optimal antenna subset $A_g$ ($1 \leq g \leq 2^n-1$) having a quasi-optimal power allocation weight $w_g$ based on a predetermined power allocation, for each one of the plurality of multiple combinable antenna subsets;
   calculating a plurality of SER approximation values of the selected quasi-optimal antenna subsets by applying a Probability Density Function (PDF) of a Signal-to-Noise Ratio (SNR) to a OSTBC SER having a symbol constellation of a predetermined modulation scheme;
   determining an optimal SER approximation value to be equal to a minimum of the plurality of SER approximation values; and
   outputting the optimal SER approximation value to an encoder for optimal power allocation based on the optimal SER approximation value;
   wherein the OSTBC SER includes at least one among an OSTBC SER having Multiple Quadrature Amplitude Modulation (MQAM) symbols, an OSTBC SER having M-ary Phase Shift Keying (MPSK) symbols, an OSTBC SER having Binary Phase Shift Keying (BPSK) symbols, and an OSTBC SER having Quadrature Phase Shift Keying (QPSK) symbols; and
   wherein the OSTBC SER having the at least one among an OSTBC SER having Multiple Quadrature Amplitude Modulation (MQAM) symbols, the OSTBC SER having M-ary Phase Shift Keying (MPSK) symbols, the OSTBC SER having Binary Phase Shift Keying (BPSK)

symbols, and the OSTBC SER having Quadrature Phase Shift Keying (QPSK) symbols, is defined by $$P_{MQAM} = 1 - \left(1 - \int_0^\infty 2\left(1 - \frac{1}{\sqrt{M}}\right)Q\left(\sqrt{\frac{3}{M-1}}\,x\right)f_\eta(x)dx\right)^2,$$

$$P_{M_g PSK} = \int_0^\infty \left(2Q\left(\sqrt{2x}\sin\frac{\pi}{M_g}\right) - \frac{1}{\pi}\int_{\frac{\pi}{2}-\frac{\pi}{M_g}}^{\frac{\pi}{2}} e^{-x\left(\sin\frac{\pi}{M_g}\right)/\cos^2\theta}d\theta\right)f_\eta(x)dx,$$

$$P_{BPSK} \approx \int_0^\infty Q(\sqrt{2x})f_\eta(x)dx,\text{ and}$$

$$P_{QPSK} \approx \frac{1}{2}\int_0^\infty Q(\sqrt{x})f_\eta(x)dx,\text{ respectively,}$$

wherein
η=SNR,
$f_\eta(x)$=PDF of η, and
M=M-ary level of MQAM and MPSK.

11. A method for Symbol Error Rate (SER) approximation of an SER-based transmission power allocation operation for an Orthogonal Space Time Block Code (OSTBC) in a Distributed Wireless Communication System (DWCS) equipped with multiple transmission Distributed Antennas (DA) geographically dispersed at random, the method for SER approximation comprising the steps of:
  setting a plurality of multiple combinable antenna subsets from dispersed multiple DAs;
  selecting quasi-optimal antenna subsets, each quasi-optimal antenna subset $A_g$ ($1 \leq g \leq 2^n - 1$) having a quasi-optimal power allocation weight $w_g$ based on a predetermined power allocation, for each one of the plurality of multiple combinable antenna subsets;
  calculating a plurality of SER approximation values of the selected quasi-optimal antenna subsets by applying a Probability Density Function (PDF) of a Signal-to-Noise Ratio (SNR) to a OSTBC SER having a symbol constellation of a predetermined modulation scheme;
  determining an optimal SER approximation value to be equal to a minimum of the plurality of SER approximation values; and
  outputting the optimal SER approximation value to an encoder for optimal power allocation based on the optimal SER approximation value;
  wherein the OSTBC SER includes at least one among an OSTBC SER having Multiple Quadrature Amplitude Modulation (MQAM) symbols, an OSTBC SER having M-ary Phase Shift Keying (MPSK) symbols, an OSTBC SER having Binary Phase Shift Keying (BPSK) symbols, and an OSTBC SER having Quadrature Phase Shift Keying (QPSK) symbols; and
  wherein the plurality of SER approximation values obtained by applying the PDF of the SNR to the OSTBC SER having symbols of MQAM, MPSK, BPSK, and QPSK are defined by $$P^{A_g}_{M_g-QAM} \approx 1 - \left(1 - C_1 \Gamma(D)(C_2)^{-D} \times \left(1 - \frac{1}{\sqrt{M_g}}\right)\left(1 - \sum_{t=0}^{D-1}\mu\left(\frac{1-\mu^2}{4}\right)^t \binom{2t}{t}\right)\right)^2,$$

-continued $$P^{A_g}_{M_g-PSK} \approx C_1 \Gamma(D)(C_2)^{-D}\left(1 - \sum_{t=0}^{D-1}(1 + C_2/\sin^2(\pi/M_g))^{-0.5}\left(\frac{1-(1+C_2/\sin^2(\pi/M_g))^{-1}}{4}\right)^t \binom{2t}{t}\right),$$

$$P^{A_g}_{BPSK} \approx \frac{1}{2}C_1 \Gamma(D)(C_2)^{-D}\left(1 - \sum_{t=0}^{D-1}(1+C_2)^{-0.5}\left(\frac{1-(1+C_2)^{-1}}{4}\right)^t \binom{2t}{t}\right),$$

and $$P^{A_g}_{QPSK} \approx \frac{1}{4}C_1 \Gamma(D)(C_2)^{-D}\left(1 - \sum_{t=0}^{D-1}(1+2C_2)^{-0.5}\left(\frac{1-(1+2C_2)^{-1}}{4}\right)^t \binom{2t}{t}\right),$$

respectively, wherein $$D = m\sum_{j=1}^{g} m_j,$$

$$C_2 = \sum_{j=1}^{g} m_j/\Omega_j w_j q_j \rho,$$

$$C_1 = \prod_{j=1}^{g}(\Gamma(gm_j m))^{-\frac{1}{g}}(\Omega_j w_j q_j \rho/m_j)^{-m_j m},$$

$\mu=\sqrt{3/(3+2C_2(M_g-1))}$,
M=M-ary level of MQAM and MPSK,
$w_j$=corresponding power allocation weight,
ρ=Transmit Power to Receive Noise Ratio (TSNR),
$m_j$=corresponding parameter of Nakagami fading,
$\Omega_j$=large-scale fading for the $j^{th}$ DA, and
g=combination of optimal DAs.

12. A method for Symbol Error Rate (SER) approximation of an SER-based transmission power allocation operation for an Orthogonal Space Time Block Code (OSTBC) in a Distributed Wireless Communication System (DWCS) equipped with multiple transmission Distributed Antennas (DA) geographically dispersed at random, the method for SER approximation comprising the steps of:
  setting a plurality of multiple combinable antenna subsets from dispersed multiple DAs;
  selecting quasi-optimal antenna subsets, each quasi-optimal antenna subset $A_g$ ($1 \leq g \leq 2^n - 1$) having a quasi-optimal power allocation weight $w_g$ based on a predetermined power allocation, for each one of the plurality of multiple combinable antenna subsets;
  calculating a plurality of SER approximation values of the selected quasi-optimal antenna subsets by applying a Probability Density Function (PDF) of a Signal-to-Noise Ratio (SNR) to a OSTBC SER having a symbol constellation of a predetermined modulation scheme;
  determining an optimal SER approximation value to be equal to a minimum of the plurality of SER approximation values; and
  outputting the optimal SER approximation value to an encoder for optimal power allocation based on the optimal SER approximation value;

wherein the OSTBC SER includes at least one among an OSTBC SER having Multiple Quadrature Amplitude Modulation (MQAM) symbols, an OSTBC SER having M-ary Phase Shift Keying (MPSK) symbols, an OSTBC SER having Binary Phase Shift Keying (BPSK) symbols, and an OSTBC SER having Quadrature Phase Shift Keying (QPSK) symbols;

wherein, when the plurality of SER approximation values are calculated by applying the PDF of the SNR to the OSTBC SER having symbols of MQAM and MPSK, the SER approximation values are obtained by omitting $e^{-xC_2}$ from the PDF of the SNR in a high TSNR region, as defined by $$P_{M_g-QAM}^{A_g(High\_\rho)} = 1 - \left(1 - \frac{\prod_{t=1}^{D}(2D-(2t-1))}{D}\left(1-\frac{1}{\sqrt{M_g}}\right)\left(\frac{3}{M_g-1}\right)^{-D}C_1\right)^2,$$

and $$P_{M_g-PSK}^{A_g(High\_\rho)} = \frac{\prod_{t=1}^{D}(2D-(2t-1))}{D}(2\sin^2(\pi/M_g))^{-D}C_1, \text{ respectively,}$$

-continued wherein $$D = m\sum_{j=1}^{g} m_j,$$

$$C_1 = \prod_{j=1}^{g}(\Gamma(gm_jm))^{-\frac{1}{g}}(\Omega_j w_j q_j \rho/m_j)^{-m_jm},$$

$$C_2 = \sum_{j=1}^{g} m_j/\Omega_j w_j q_j \rho g,$$

$w_j$=corresponding power allocation weight,
$\rho$=Transmit Power to Receive Noise Ratio (TSNR),
$m_j$=corresponding parameter of Nakagami fading,
$\Omega_j$=larg-scale fading for the $j^{th}$ DA, and
g=combination of optimal DAs.

* * * * *

UNITED STATES PATENT AND TRADEMARK OFFICE
CERTIFICATE OF CORRECTION

PATENT NO. : 8,571,121 B2  
APPLICATION NO. : 12/034723  
DATED : October 29, 2013  
INVENTOR(S) : Shuangfeng Han et al.

Page 1 of 1

It is certified that error appears in the above-identified patent and that said Letters Patent is hereby corrected as shown below:

In the Claims

Column 15, Claim 11, Line 33 should read as follows:
--...antenna subset $A_g$ ($1 \leq g \leq 2^n - 1$) having...--

Signed and Sealed this  
Twenty-fifth Day of March, 2014

Michelle K. Lee  
*Deputy Director of the United States Patent and Trademark Office*